United States Patent
Katz et al.

(10) Patent No.: US 12,412,071 B2
(45) Date of Patent: Sep. 9, 2025

(54) CREATING SATISFICING PLANNERS WITH DEEP LEARNING

(71) Applicant: International Business Machines Corporation, Armonk, NY (US)

(72) Inventors: Michael Katz, Goldens Bridge, NY (US); Patrick Christoph Ferber, Au (DE)

(73) Assignee: International Business Machines Corporation, Armonk, NY (US)

( * ) Notice: Subject to any disclaimer, the term of this patent is extended or adjusted under 35 U.S.C. 154(b) by 742 days.

(21) Appl. No.: 17/646,088

(22) Filed: Dec. 27, 2021

(65) Prior Publication Data

US 2023/0206027 A1    Jun. 29, 2023

(51) Int. Cl.
- *G06N 3/042* (2023.01)
- *G06N 3/08* (2023.01)
- *H04L 41/14* (2022.01)

(52) U.S. Cl.
CPC ............ *G06N 3/042* (2023.01); *G06N 3/08* (2013.01); *H04L 41/14* (2013.01)

(58) Field of Classification Search
CPC ........................................ G06N 3/042
USPC ............................. 706/12; 345/611
See application file for complete search history.

(56) References Cited

U.S. PATENT DOCUMENTS

| | | | |
|---|---|---|---|
| 9,201,426 B1 | 12/2015 | Bonawitz | |
| 10,296,862 B1 | 5/2019 | Oddo | |
| 10,373,092 B2 | 8/2019 | De | |
| 10,726,368 B2 | 7/2020 | Bunkheila | |
| 10,762,457 B2 | 9/2020 | Grant | |
| 10,783,441 B2 | 9/2020 | Riabov | |
| 10,878,505 B1* | 12/2020 | Blair | G06V 10/82 |
| 2018/0296281 A1* | 10/2018 | Yeung | A61B 34/32 |
| 2018/0314935 A1* | 11/2018 | Lewis | G06N 3/063 |
| 2019/0108912 A1* | 4/2019 | Spurlock, III | A61P 25/28 |
| 2019/0184561 A1 | 6/2019 | Yip | |
| 2020/0074315 A1 | 3/2020 | Katz | |
| 2020/0097920 A1 | 3/2020 | Doctor | |
| 2020/0103523 A1* | 4/2020 | Liu | G01S 13/87 |

(Continued)

FOREIGN PATENT DOCUMENTS

| | | | | |
|---|---|---|---|---|
| CN | 113642082 A | * | 11/2021 | ............. G06F 30/13 |
| WO | WO-2018175585 A2 | * | 9/2018 | ......... A61K 2239/50 |

OTHER PUBLICATIONS

Baier, et al., "A Heuristic Search Approach to Planning With Temporally Extended Preferences", Artificial Intelligence 173 (2009), Nov. 28, 2008, 26 pgs., http://dx.doi.org/10.1016/j.artint.2008.11.011.

(Continued)

*Primary Examiner* — Ruay Ho
(74) *Attorney, Agent, or Firm* — Robert D. Bean

(57) ABSTRACT

Some embodiments of the present invention are directed to a method of choosing the components for a satisficing planner using machine learning (ML) (for example, deep learning (DL)). Some embodiments of the present invention are directed to choosing search algorithm component(s) for a satisficing planner using ML (for example, DL). Some embodiments of the present invention are directed to choosing search refinement components (that is, search boosting component(s) and/or search pruning component(s)) for a satisficing planner using ML (for example, DL).

11 Claims, 3 Drawing Sheets

(56) References Cited

U.S. PATENT DOCUMENTS

| | | |
|---|---|---|
| 2020/0122039 A1 | 4/2020 | Meuleau |
| 2020/0183653 A1 | 6/2020 | Subbiah |
| 2020/0226464 A1 | 7/2020 | Warren |
| 2021/0104294 A1* | 4/2021 | Hacohen ............... G16B 40/20 |
| 2021/0216879 A1 | 7/2021 | Katz |
| 2023/0146390 A1* | 5/2023 | Sadaka ................... G06T 5/60 |
| | | 345/611 |

OTHER PUBLICATIONS

Cenamor, et al., The IBaCoP Planning System: Instance-Based Configured Portfolios, Journal of Artificial Intelligence Research 56 (2016) 657-691, Submitted on Jan. 2016, Published on Aug. 2016, 35 pgs., <https://doi.org/10.1613/jair.5080>.

Gehring, et al., "Reinforcement Learning for Classical Planning: Viewing Heuristics as Dense Reward Generators", arXiv:2109.14830v1 [cs.AI] Sep. 30, 2021, 15 pgs., <https://arxiv.org/abs/2109.14830>.

Helmert, M., "The Fast Downward Planning System", Journal of Artificial Intelligence Research 26 (2006), Jul. 2006, 56 pgs.

Katz, et al., "Delfi: Online Planner Selection for Cost-Optimal Planning", 2018, 12 pgs.

Rivlin, et al., "Generalized Planning With Deep Reinforcement Learning", arXiv: 2005.02305v1 [cs.AI], May 5, 2020, 13 pgs.

Scala, et al., "Subgoaling Techniques for Satisficing and Optimal Numeric Planning", Journal of Artificial Intelligence Research, 68, 691-752, Aug. 2020, 62 pgs.

Shleyfman, et al., "Heuristics and Symmetries in Classical Planning", Proceedings of the Twenty-Ninth AAAI Conference on Artificial Intelligence, 2015, 7 pgs.

Sievers, et al., "Deep Learning for Cost-Optimal Planning: Task-Dependent Planner Selection", The Thirty-Third AAAI Conference on Artificial Intelligence (AAAI-19), vol. 33 No. 01: AAAI-19, IAAI-19, EAAI-20, Jul. 17, 2019, 9 pgs., <https://doi.org/10.1609/aaai.v33i01.33017715>.

Sievers, et al., "Structural Symmetries of the Lifted Representation of Classical Planning Tasks", 2017, 8 pgs.

Speck, et al., "Learning Heuristic Selection With Dynamic Algorithm Configuration", arXiv: 2006.08246v1 [cs.AI], Jun. 15, 2020, 10 pgs.

Speck, et al., "Learning Heuristic Selection With Dynamic Algorithm Configuration", Proceedings of the Thirty-First International Conference on Automated Planning and Scheduling (ICAPS2021), May 17, 2021, 9 pgs.

Torralba, A., et al., "Completeness-Preserving Dominance Techniques for Satisficing Planning", Proceedings of the Twenty-Seventh International Joint Conference on Artificial Intelligence (IJCAI-18), 2018, 8 pgs.

\* cited by examiner

CREATING SATISFICING PLANNERS WITH DEEP LEARNING

BACKGROUND

The present invention relates generally to the field of computer-implemented, multi-component satisficing planner assemblies (better known in the art, more simply, as "satisficing planners").

One known type of planner is called an "optimizing planner." These planners typically have one component. These optimizing planners typically include only a top level component, which represents, essentially, the entirety of the optimizing planners. Optimizing planners are not the focus of this document and are thought not be particularly relevant to the technology described herein.

Optimizing planners should not be confused with another known technology called "satisficing planners." Satisficing planners typically include multiple components, or algorithms, that are assembled to form the entirety of the satisficing planner. Three component types that are commonly included in currently conventional satisficing planners are: (i) heuristic function; (ii) search algorithm; (iii) search refinement algorithm. Search refinement algorithms include two subtypes as follows: search boosting algorithms and search pruning algorithms.

It is understood in the art that: (i) not all currently conventional satisficing planners include all of these component types/subtypes; (ii) some currently conventional satisficing planners may include additional component types (that is, types now known or to be developed in the future); (iii) more than one component of a given component type may be included in a single satisficing planner. For example, a single satisficing planner might include: two heuristic functions, three search algorithms, one search boosting algorithm and one search pruning algorithm. It is further understood in the art that the order in which the components are programmed to run is important to the proper performance of the assembled satisficing planner.

It is known that, for each instance of a given component type/subtype in a single satisficing planner, there are typically multiple "component candidates" (that is, different algorithms) to select from in assembling the satisficing planner. Some currently known heuristic function component candidates are as follows: (i) fast forward (FF); (ii) red-black (RB); (iii) causal graph (CG); (iv) Additive; and (v) Landmark Count (LM). Some currently known search algorithm component candidates are as follows: (i) greedy best-first search (GFBS); (ii) weighted A*(wA*) where w=5; (iii) weighted A*(wA*) where w=3; (iv) weighted A*(wA*) where w=2; (v) weighted A*(wA*) where w=1; and (vi) best-first width search. Some currently known search refinement component candidates are as follows: (i) single queue search boosting algorithm; (ii) dual queue search boosting algorithm with second queue for preferred operators; and (iii) novelty based search pruning algorithm.

The Wikipedia entry for "machine learning" states, in part, as follows (as of 1 Dec. 2021): "Machine learning (ML) is the study of computer algorithms that can improve automatically through experience and by the use of data. It is seen as a part of artificial intelligence. Machine learning algorithms build a model based on sample data, known as training data, in order to make predictions or decisions without being explicitly programmed to do so. Machine learning programs can perform tasks without being explicitly programmed to do so. It involves computers learning from data provided so that they carry out certain tasks. For simple tasks assigned to computers, it is possible to program algorithms telling the machine how to execute all steps required to solve the problem at hand; on the computer's part, no learning is needed. For more advanced tasks, it can be challenging for a human to manually create the needed algorithms. In practice, it can turn out to be more effective to help the machine develop its own algorithm, rather than having human programmers specify every needed step. The discipline of machine learning employs various approaches to teach computers to accomplish tasks where no fully satisfactory algorithm is available. In cases where vast numbers of potential answers exist, one approach is to label some of the correct answers as valid. This can then be used as training data for the computer to improve the algorithm(s) it uses to determine correct answers." (footnotes omitted)

The Wikipedia entry for "deep learning" states, in part, as follows (as of 1 Dec. 2021): "Deep learning (also known as deep structured learning) is part of a broader family of machine learning methods based on artificial neural networks with representation learning. Learning can be supervised, semi-supervised or unsupervised. Deep-learning architectures such as deep neural networks, deep belief networks, deep reinforcement learning, recurrent neural networks and convolutional neural networks have been applied to fields including computer vision, speech recognition, natural language processing, machine translation, bioinformatics, drug design, medical image analysis, material inspection and board game programs, where they have produced results comparable to and in some cases surpassing human expert performance. Artificial neural networks (ANNs) were inspired by information processing and distributed communication nodes in biological systems. ANNs have various differences from biological brains. Specifically, artificial neural networks tend to be static and symbolic, while the biological brain of most living organisms is dynamic (plastic) and analogue. The adjective 'deep' in deep learning refers to the use of multiple layers in the network. Early work showed that a linear perceptron cannot be a universal classifier, but that a network with a nonpolynomial activation function with one hidden layer of unbounded width can. Deep learning is a modern variation which is concerned with an unbounded number of layers of bounded size, which permits practical application and optimized implementation, while retaining theoretical universality under mild conditions. In deep learning the layers are also permitted to be heterogeneous and to deviate widely from biologically informed connectionist models, for the sake of efficiency, trainability and understandability, whence the 'structured' part. Definition[:]. Deep learning is a class of machine learning algorithms that uses multiple layers to progressively extract higher-level features from the raw input. For example, in image processing, lower layers may identify edges, while higher layers may identify the concepts relevant to a human such as digits or letters or faces. Most modern deep learning models are based on artificial neural networks, specifically convolutional neural networks (CNN)s, although they can also include propositional formulas or latent variables organized layer-wise in deep generative models such as the nodes in deep belief networks and deep Boltzmann machines. In deep learning, each level learns to transform its input data into a slightly more abstract and composite representation. In an image recognition application, the raw input may be a matrix of pixels; the first representational layer may abstract the pixels and encode edges; the second layer may compose and encode arrangements of edges; the third layer may encode a nose and eyes; and the fourth layer may recognize that the image contains a face. Importantly, a deep learning process can learn which features to optimally place in which level on its own. This does not completely eliminate the need for hand-tuning; for example, varying numbers of layers and layer sizes can provide different degrees of abstraction. The word 'deep' in 'deep learning' refers to the number of layers through which the data is transformed." (footnotes omitted))

One known approach to prediction of planner performance based on deep learning is presented in the published article "Deep Learning for Cost-Optimal Planning: Task-Dependent Planner Selection," SIEVERS, et al., The Thirty-Third AAAI Conference on Artificial Intelligence (AAAI-19), Vol. 33 No. 01: AAAI-19, IAAI-19, EAAI-20, Jul. 17, 2019 (hereinafter, the "Deep Learning for Cost-Optimal Planning article).

SUMMARY

According to an aspect of the present invention, there is a method, computer program product and/or system that performs the following operations (not necessarily in the following order): (i) receive a planner application data set that includes information indicative of contexts in which a newly-designed satisficing planner is expected to be applied; (ii) receiving a machine learning algorithm that has been trained to design satisficing planners; and (iii) applying the machine learning algorithm to the planner application data set to obtain a newly-designed satisficing planner design, with the newly-designed satisficing planner design including information indicative of a plurality of satisficing planner components to be included in the newly-designed satisficing planner design and an order in which the satisficing components are to be run.

According to an aspect of the present invention, there is a method, computer program product and/or system that performs the following operations (not necessarily in the following order): (i) receive a planner application data set that includes information indicative of contexts in which a newly-designed satisficing planner is expected to be applied; (ii) receiving a machine learning algorithm that has been trained to determine search algorithm component(s) for satisficing planners; and (iii) applying the machine learning algorithm to the planner application data set to determine search algorithm component(s) for use in a newly-designed satisficing planner design.

According to an aspect of the present invention, there is a method, computer program product and/or system that performs the following operations (not necessarily in the following order): (i) receive a planner application data set that includes information indicative of contexts in which a newly-designed satisficing planner is expected to be applied; (ii) receiving a machine learning algorithm that has been trained to determine search algorithm component(s) for satisficing planners; and (iii) applying the machine learning algorithm to the planner application data set to determine search refinement component(s) for use in a newly-designed satisficing planner design.

DETAILED DESCRIPTION

Figure 1:
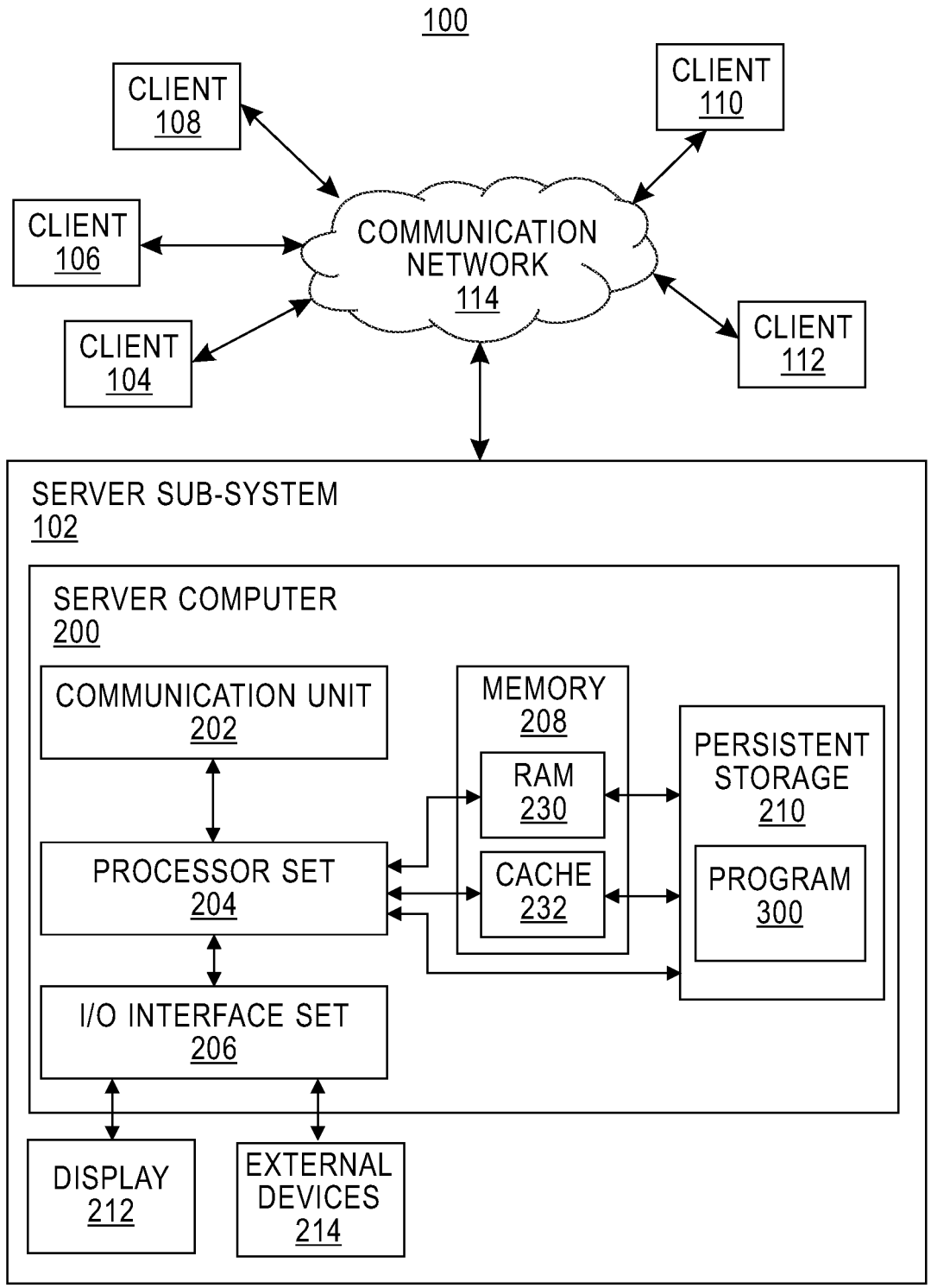
FIG. 1 is a block diagram view of a first embodiment of a system according to the present invention.

Some embodiments of the present invention are directed to a method of choosing the components for a satisficing planner using machine learning (ML) (for example, deep learning (DL)). Some embodiments of the present invention are directed to choosing search algorithm component(s) for a satisficing planner using ML (for example, DL). Some embodiments of the present invention are directed to choosing search refinement components (that is, search boosting component(s) and/or search pruning component(s)) for a satisficing planner using ML (for example, DL). This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
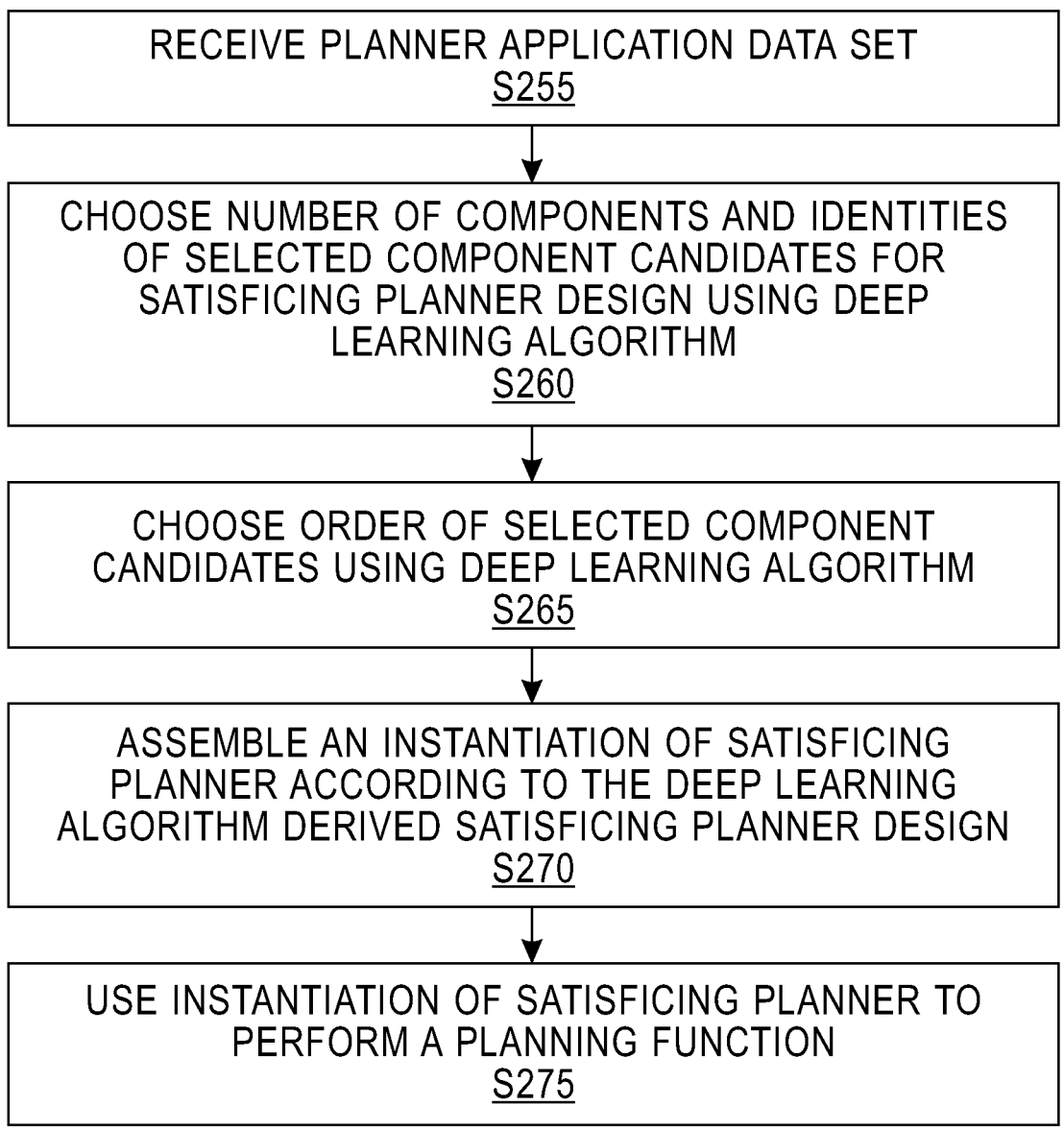
FIG. 2 is a flowchart showing a first embodiment method performed, at least in part, by the first embodiment system.
Figure 3:
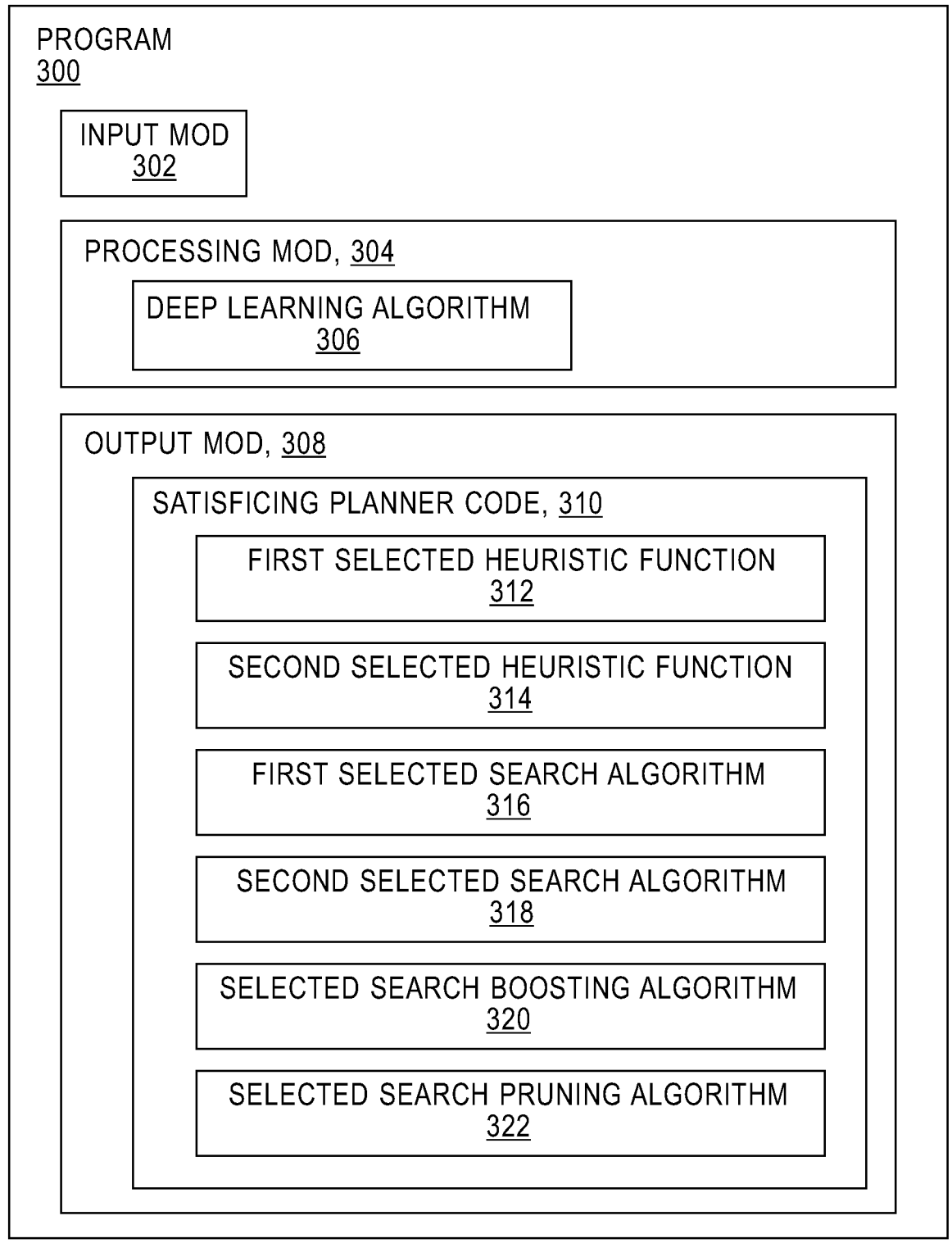
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins at operation S255, where input module ("mod") 302 receives a planner application data set that includes information indicative of contexts in which a newly-designed satisficing planner is expected to be applied. In this example: (i) the data set is received from client subsystem 104 trough network 114; (ii) the data set includes a previous iteration of a satisficing planner design that has been used, and had its usage monitored, in similar contexts; and (iii) the previously used planner includes multiple components of several different component types/subtypes and will be used a basis for designing a newly-designed satisficing planner design.

Processing proceeds to operation S260, where processing mod 304 receives deep learning (DL) algorithm 306 that has been trained to design satisficing planners. In this embodiment, the deep learning architecture and conceptual approach set forth in the "Deep Learning for Cost-Optimal Planning" article is used as the basis of the deep learning algorithm. See, especially, the architecture shown in FIG. 2 of this article. Alternative and/or additionally, in performing operation S260, some embodiments may: (i) add more hidden layers to perform operation S260; (ii) use other architectures for image convolution (now known or to be developed in the future); and/or (iii) use graph neural networks (GNNs).

Processing proceeds to operation S265, where processing mod 304 applies DL algorithm 306 to the planner application data set to obtain a newly-designed satisficing planner design (which will be instantiated in the next operation in the form of satisficing planner code 310). In this example, the newly-designed satisficing planner design includes three component types as follows: (i) heuristic function type (two components); (ii) search algorithm type (two components; and (iii) search refinement type (two components). Accordingly, there is a total of six (6) components in the new design. The newly-designed satisficing planner design also specifies an order in which the six (6) satisficing components are to be run.

Processing proceeds to operation S270, where an actual instantiation of code for implementing the newly-designed satisficing planner is instantiated as satisficing planner code 310. More specifically, code 310, according to the newly-designed satisficing planner design, includes six selected component candidates: (i) first selected heuristic function 312 (in this example, a red-black component candidate is chosen for component 312 from among the heuristic function candidates listed, above, in the Background section); (ii) second selected heuristic function 314 (in this example, an additive component candidate); (iii) first selected search algorithm 316 (in this example, a greedy best-first search (GFBS) algorithm); (iv) second selected search algorithm 318 (in this example, a best-first width search algorithm); (v) selected search boosting algorithm 320; and (vi) selected search pruning algorithm 322.

Processing proceeds to operation S275, where output mod 308 sends a copy of code 310 out through network 114 to client subsystems 104 and 110, where it will be used to perform various satisficing planner type functions.

III. Further Comments and/or Embodiments

An embodiment of a method of creating a satisficing planner with deep learning according to the present invention includes the following operations (not necessarily in the following order): (i) the total time bound is provided in advance; (ii) the learning is performed to estimate the quality of the solution and the time performance of each individual planner; (iii) the training data is obtained by running the planners on existing planning tasks, with various bounds on solution costs as input; (iv) the trained network is used as a successor generator for traversing the possible sequences of invocations of various planners; and (v) the traversal results in a sequence of invocations of planners, which constitutes the created satisficing planner.

Some embodiments of the present invention may include one, or more, of the following features, advantages, operations and/or characteristics: (i) train a single network for all possible planning domains, to predict a time and quality of solution per algorithm and planning task pair; (ii) the predicted values are then used to guide a search; (iii) the outcome of the search is a sequence of algorithms that can be applied to the planning task to solve it; and/or (iv) a heuristic search-based solution to numeric planning.

Some embodiments of the present invention may include one, or more, of the following features, advantages, operations and/or characteristics: (i) provides a technique that works well for many planning problems; (ii) affords flexibility in choosing a next iteration of a satisficing planner, based on the performance in the previous iterations of similar satisficing planner(s); (iii) given a planning task, generate a sequence of calls to planners, tailored to that specific task; (iv) the sequence is generated using a traversal through the space of sequences of iterations, using a neural network for a successor generation, predicting for a given task and the bound on solution quality, the outcome solution quality and the total time for the iteration; (v) the network is trained using performance data of the possible planners used for each single iteration on existing planning benchmark sets; and/or (vi) the search aims at finding a sequence of iterations that results in the best predicted solution quality, while keeping the total predicted time under the given bound.

An embodiment of a method of creating a satisficing planner with deep learning according to the present invention includes the following operations (not necessarily in the following order): (i) chooses a collection of planners to use in iterations by running the planners on existing planning tasks to obtain their performance data and reiterating with decreasing bounds from previously found solutions; (iii) given the data, train a network to predict for a planning task and a bound the quality of solution obtained and the time performance estimate; (iv) for a given planning task, traverse the space of sequences of planner iterations; (v) each search node represents a sequence of planner iterations, so that each node accumulates the total time so far and keeps the estimated solution quality while pruning nodes with accumulated total time beyond the given bound; and (vi) create successor nodes using the trained network for successor generation, using the estimated solution quality and the planning task as input.

An embodiment of a method of creating a satisficing planner with deep learning according to the present invention includes the following operations (not necessarily in the following order): (i) the total time bound is provided in advance; (ii) the learning is performed to estimate the quality of the solution and the time performance of each individual planner; (iii) the training data is obtained by running the planners on existing planning tasks, with various bounds on solution costs as input; (iv) the trained network is used as a successor generator for traversing the possible sequences of invocations of various planners; and/or (v) the traversal results in a sequence of invocations of planners, which constitutes the created satisficing planner.

Some embodiments of the present invention may include one, or more, of the following features, advantages, operations and/or characteristics: (i) where the various bounds for generating training data are obtained from the quality of the solution found in the previous iteration; (ii) where the sequences are pruned based on the accumulated predicted total time; (iii) where the representation of a planning task is an image or a graph; and/or (iv) improving planner performance allows to better support a variety of use cases.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above-similar cautions apply to the term "embodiment."

And/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
receiving a planner application data set that includes information indicative of contexts in which a newly-designed satisficing planner is expected to be applied;
receiving a machine learning algorithm that has been trained to design satisficing planners; and
applying the machine learning algorithm to the planner application data set to obtain a newly-designed satisficing planner design, with the newly-designed satisficing planner design including the information indicative of a plurality of satisficing planner components to be included in the newly-designed satisficing planner design and an order in which the satisficing components are to be run, wherein the applying of the machine learning algorithm includes the following operations:
for each given satisficing planner component of the plurality of satisficing planner components, determining a component type from a plurality of component types for the given satisficing planner component, wherein the plurality of component types are selected from a list consisting of heuristic function types, search algorithm types, and refinement algorithm types, and wherein the refinement algorithm types comprise a search boosting component subtype and a search pruning component; and
for each given satisficing planner component of the plurality of satisficing planner components, determining a component candidate, from among a plurality of component candidates, of the determined component type of the given satisficing planner component.

2. The method of claim 1, wherein the machine learning algorithm is a deep learning algorithm that includes a plurality of layers.

3. The method of claim 2, wherein the plurality of layers includes a plurality of hidden layers.

4. The method of claim 1, wherein:
the planner application data set includes a previously used satisficing planner design; and
the application of the machine learning algorithm uses the previously used satisficing planner as a basis for the newly-designed satisficing planner design.

5. The method of claim 1, wherein the newly-designed satisficing planner design includes:
at least one satisficing planner component of the heuristic function type;
at least one satisficing planner component of the search algorithm type; and
at least one satisficing planner component of the search refinement type.

6. A computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving a planner application data set that includes information indicative of contexts in which a newly-designed satisficing planner is expected to be applied;
receiving a machine learning algorithm that has been trained to design satisficing planners; and
applying the machine learning algorithm to the planner application data set to obtain a newly-designed satisficing planner design, with the newly-designed satisficing planner design including the information indicative of a plurality of satisficing planner components to be included in the newly-designed satisficing planner design and an order in which the satisficing components are to be run, wherein the applying of the machine learning algorithm includes the following operations:
for each given satisficing planner component of the plurality of satisficing planner components, determining a component type from a plurality of component types for the given satisficing planner component, wherein the plurality of component types are selected from a list consisting of heuristic function types, search algorithm types, and refinement algorithm types, and wherein the refinement algorithm types comprise a search boosting component subtype and a search pruning component; and
for each given satisficing planner component of the plurality of satisficing planner components, determining a component candidate, from among a plurality of component candidates, of the determined component type of the given satisficing planner component.

7. The computer system of claim 6 wherein the machine learning algorithm is a deep learning algorithm that includes a plurality of layers.

8. The computer system of claim 7 where the plurality of layers includes a plurality of hidden layers.

9. A computer program product comprising:
one or more computer-readable tangible storage media and program instructions stored on at least one of the one or more tangible storage media, the program instructions executable by a processor to cause the processor to perform a method comprising:
receiving a planner application data set that includes information indicative of contexts in which a newly-designed satisficing planner is expected to be applied;
receiving a machine learning algorithm that has been trained to design satisficing planners; and
applying the machine learning algorithm to the planner application data set to obtain a newly-designed satisficing planner design, with the newly-designed satisficing planner design including the information indicative of a plurality of satisficing planner components to be included in the newly-designed satisficing planner design and an order in which the satisficing components are to be run, wherein the applying of the machine learning algorithm includes the following operations:

for each given satisficing planner component of the plurality of satisficing planner components, determining a component type from a plurality of component types for the given satisficing planner component, wherein the plurality of component types are selected from a list consisting of heuristic function types, search algorithm types, and refinement algorithm types, and wherein the refinement algorithm types comprise a search boosting component subtype and a search pruning component; and for each given satisficing planner component of the plurality of satisficing planner components, determining a component candidate, from among a plurality of component candidates, of the determined component type of the given satisficing planner component.

10. The computer program product of claim 9 wherein the machine learning algorithm is a deep learning algorithm that includes a plurality of layers.

11. The computer program product of claim 10, wherein the plurality of layers includes a plurality of hidden layers.

* * * * *